United States Patent
Anchi et al.

(10) Patent No.: US 11,016,699 B2
(45) Date of Patent: May 25, 2021

(54) HOST DEVICE WITH CONTROLLED CLONING OF INPUT-OUTPUT OPERATIONS

(71) Applicant: EMC IP Holding Company LLC, Hopkinton, MA (US)

(72) Inventors: Amit Pundalik Anchi, Bangalore (IN); Madhu Tarikere, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 30 days.

(21) Appl. No.: 16/516,367

(22) Filed: Jul. 19, 2019

(65) Prior Publication Data
US 2021/0019054 A1 Jan. 21, 2021

(51) Int. Cl.
G06F 3/06 (2006.01)

(52) U.S. Cl.
CPC ............ G06F 3/065 (2013.01); G06F 3/0604 (2013.01); G06F 3/067 (2013.01); G06F 3/0644 (2013.01); G06F 3/0659 (2013.01)

(58) Field of Classification Search
CPC ........ G06F 3/065; G06F 3/067; G06F 3/0659; G06F 3/0644; G06F 3/0604; G06F 3/0617; G06F 3/0635
USPC ................................................. 711/154, 162
See application file for complete search history.

(56) References Cited

U.S. PATENT DOCUMENTS

| | | | |
|---|---|---|---|
| 6,687,746 B1 | 2/2004 | Shuster et al. | |
| 6,697,875 B1 | 2/2004 | Wilson | |
| 7,454,437 B1 | 11/2008 | Lavallee et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,904,681 B1 | 3/2011 | Bappe et al. | |
| 7,925,872 B2 | 4/2011 | Lai et al. | |
| 8,060,710 B1 * | 11/2011 | Don | G06F 3/0617 711/161 |
| 8,996,827 B1 * | 3/2015 | Natanzon | G06F 3/06 711/162 |

(Continued)

OTHER PUBLICATIONS

Kris Piepho, "Dell EMC SC Series Storage: Microsoft Multipath I/O," Dell EMC Best Practices, Jan. 2017, 57 pages.
NVM Express, "NVM Express, Revision 1.3," NVM Express, May 1, 2017, 282 pages.
VMWARE, "Multipathing Configuration for Software iSCSI Using Port Binding," Technical White Paper, Apr. 25, 2012, 15 pages.

(Continued)

*Primary Examiner* — Hashem Farrokh
(74) *Attorney, Agent, or Firm* — Ryan, Mason & Lewis, LLP (57) ABSTRACT

An apparatus in an illustrative embodiment comprises a host device configured to communicate over a network with at least first and second storage systems each comprising a plurality of storage devices. The first and second storage systems are configured to participate in a replication process in which one or more logical storage volumes are replicated from the first storage system to the second storage system. The host device is further configured to execute at least one application, and for each of a plurality of input-output operations generated by the application, to determine a replication status of a particular portion of a given one of the logical storage volumes to which the input-output operation is directed, and to control cloning of the input-output operation based at least in part on the replication status of the particular portion of the given logical storage volume.

20 Claims, 3 Drawing Sheets

(56) References Cited

U.S. PATENT DOCUMENTS

| | | |
|---|---|---|
| 9,400,611 B1 | 7/2016 | Raizen |
| 9,594,780 B1 | 3/2017 | Esposito et al. |
| 9,778,852 B1 | 10/2017 | Marshak et al. |
| 2002/0112022 A1* | 8/2002 | Kazar ................. G06F 16/1824 709/217 |
| 2004/0010563 A1 | 1/2004 | Forte et al. |
| 2008/0043973 A1 | 2/2008 | Lai et al. |
| 2008/0183988 A1* | 7/2008 | Qi ....................... G06F 11/2082 711/162 |
| 2011/0197027 A1 | 8/2011 | Balasubramanian et al. |
| 2012/0260051 A1* | 10/2012 | Maki .................... G06F 3/0685 711/162 |
| 2015/0234766 A1* | 8/2015 | Weber .................. H04L 49/101 710/317 |
| 2016/0117113 A1 | 4/2016 | Li et al. |
| 2018/0189635 A1 | 7/2018 | Olarig et al. |
| 2019/0095299 A1 | 3/2019 | Liu et al. |
| 2019/0108888 A1 | 4/2019 | Sarkar et al. |

OTHER PUBLICATIONS

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al. on Dec. 21, 2017 and entitled "Storage System with Input-Output Performance Control Utilizing Application Process Detection."

U.S. Appl. No. 15/795,653 filed in the name of Maneesh Pusalkar et al. on Oct. 27, 2017 and entitled "Storage System with Network-Wide Configurable Device Names."

U.S. Appl. No. 16/142,274 filed in the name of Sanjib Mallick et al. on Sep. 26, 2018 and entitled "Host Device with Multi-Path Layer Implementing Automatic Standby Setting for Active-Active Configuration."

* cited by examiner

HOST DEVICE WITH CONTROLLED CLONING OF INPUT-OUTPUT OPERATIONS

FIELD

The field relates generally to information processing systems, and more particularly to storage in information processing systems.

BACKGROUND

Many information processing systems are configured to replicate data from one storage system to another storage system, possibly at different physical sites. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Storage systems participating in a replication process can therefore each be configured to support both asynchronous and synchronous replication modes.

Conventional approaches to data replication can be problematic under certain conditions. For example, the mirroring of host writes to multiple storage systems participating in a synchronous replication process can consume unduly large amounts of network bandwidth and host device processing resources.

SUMMARY

Illustrative embodiments provide a host device with functionality for controlled cloning of input-output (IO) operations. For example, such functionality in some embodiments can substantially reduce the number of host writes that are cloned for delivery to multiple storage systems participating in a synchronous replication process, thereby conserving network bandwidth and host device processing resources. It should be noted that term "replication" as used herein is intended to be broadly construed, so as to encompass migration, copying or other similar operations involving one or more logical storage volumes.

The controlled cloning functionality in some embodiments is implemented within or otherwise in cooperation with a multi-path layer of a host device that is configured to communicate with multiple storage arrays or other types of storage systems via a storage area network (SAN) or other type of network. The multi-path layer illustratively of the host device comprises at least one multi-path input-output (MPIO) driver configured to process IO operations generated by applications executing on the host device.

In one embodiment, an apparatus comprises a host device configured to communicate over a network with at least first and second storage systems each comprising a plurality of storage devices. The first and second storage systems are configured to participate in a replication process in which one or more logical storage volumes are replicated from the first storage system to the second storage system.

The host device is further configured to execute at least one application, and for each of a plurality of IO operations generated by the application, to determine a replication status of a particular portion of a given one of the logical storage volumes to which the IO operation is directed, and to control cloning of the IO operation based at least in part on the replication status of the particular portion of the given logical storage volume.

In some embodiments, the host device is further configured, responsive to the IO operation being cloned, to deliver resulting first and second instances of the IO operation to the respective first and second storage systems, and responsive to the IO operation not being cloned, to deliver the IO operation to only the first storage system.

In some embodiments, determining the replication status of the particular portion of the given logical storage volume comprises determining the replication status based at least in part on information obtained by the host device from the first storage system.

For example, the information is illustratively obtained by the host device from the first storage system utilizing an in-band communication mechanism in which one or more commands in a designated storage protocol are sent from the host device to the first storage system.

As another example, information is illustratively obtained by the host device from the first storage system utilizing an out-of-band communication mechanism in which host management software of the host device communicates with storage system management software of the first storage system over an Internet Protocol (IP) network connection.

In some embodiments, determining the replication status of the particular portion of the given logical storage volume illustratively comprises polling the first storage system to obtain information identifying one or more logical block address ranges that have either already been replicated from the first storage system to the second storage system or are in the process of being replicated from the first storage system to the second storage system, and comparing one or more logical block addresses of the IO operation to the information obtained via the polling of the first storage system.

In some embodiments, determining the replication status of the particular portion of the given logical storage volume comprises identifying the replication status as one of the following: (i) already replicated; (ii) in the process of being replicated; and (iii) not yet replicated. In such an embodiment, controlling cloning of the IO operation based at least in part on the replication status of the portion of the logical storage volume comprises, responsive to the replication status being one of (i) already replicated or (ii) in the process of being replicated, cloning the IO operation so as to provide first and second instances of the IO operation for delivery to the respective first and second storage systems, and responsive to the replication status being (iii) not yet replicated, refraining from cloning the IO operation so as to provide only a single instance of the IO operation for delivery to the first storage system.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
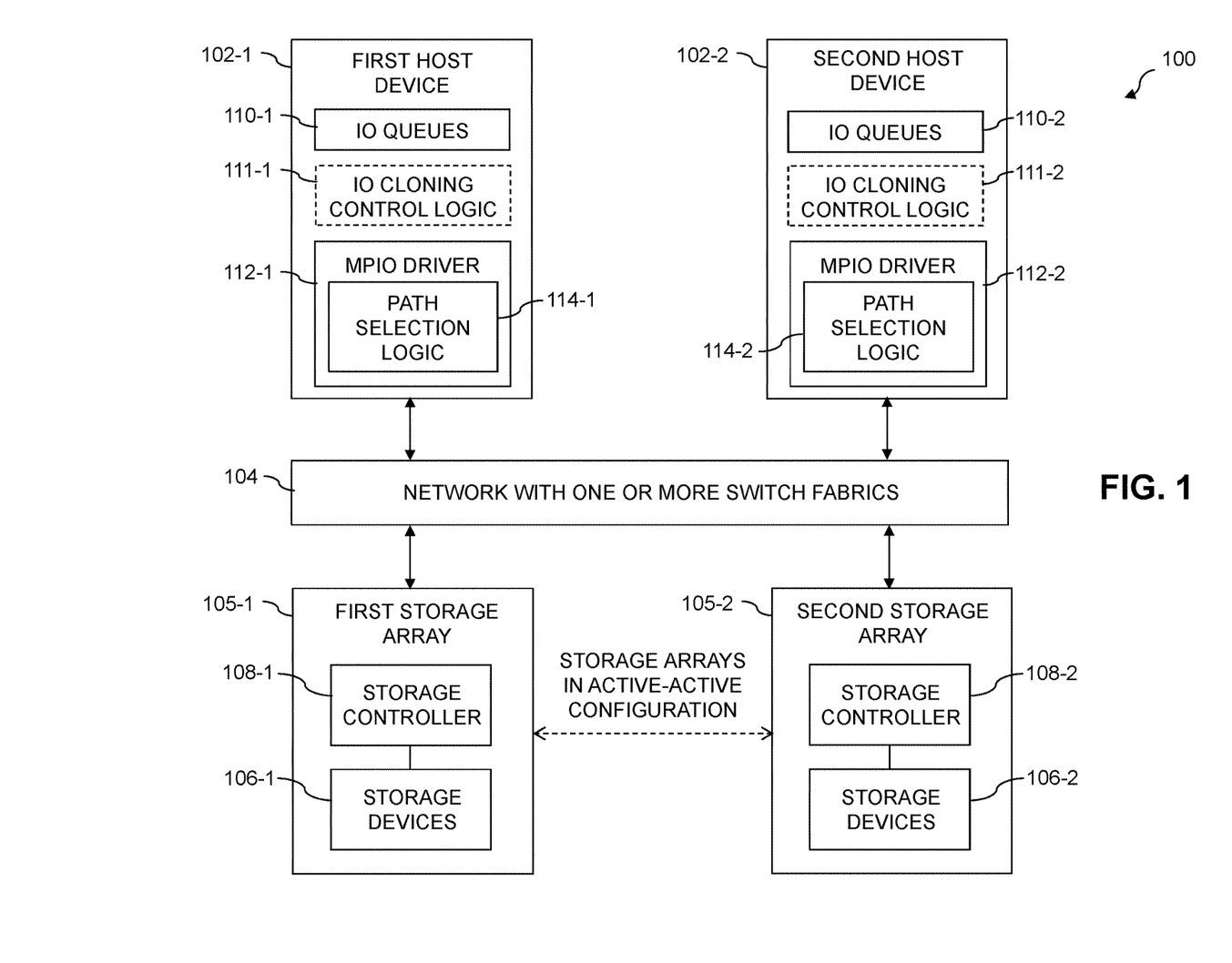
FIG. 1 is a block diagram of an information processing system configured with functionality for controlled cloning of IO operations of a host device in an illustrative embodiment.

FIG. 1 shows an information processing system 100 configured in accordance with an illustrative embodiment. The information processing system 100 comprises at least first and second host devices 102-1 and 102-2. The host devices 102 are coupled to a network 104 that comprises one or more switch fabrics. The host devices communicate over the network 104 via the one or more switch fabrics with at least first and second storage arrays 105-1 and 105-2. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices capable of communicating with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect storage system components. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2 coupled to respective storage controllers 108-1 and 108-2.

The storage devices 106 of the storage arrays 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

The storage arrays 105 may each additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. The term "storage device" as used herein is therefore intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 105 may each be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

The sets of storage devices 106 of the respective storage arrays 105 store data utilized by one or more applications running on one or more of the host devices 102. The sets of storage devices 106 are illustratively arranged in one or more storage pools. The storage arrays 105 and their respective sets of storage devices 106 are examples of what are more generally referred to herein as "storage systems." A given such storage system in the present embodiment may be shared by the host devices 102, and in such arrangements may be referred to as a "shared storage system."

The sets of storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104. Such commands in some embodiments more particularly comprise Small Computer System Interface (SCSI) commands, although other types of commands may be used in other embodiments, including commands that are part of a standard command set, or custom commands such as a "vendor unique command" or VU command that is not part of a standard command set. A given input-output (IO) operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Also, the term "storage device" as broadly used herein can encompass, for example, a logical storage device such as a LUN or other logical storage volume. A logical storage device can be defined in the storage arrays 105 to include different portions of one or more physical storage devices.

The sets of storage devices 106 may therefore be viewed as comprising respective LUNs or other logical storage volumes.

Each of the host devices 102 illustratively has multiple paths to each of the storage arrays 105 via the network 104, with at least one storage device of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

In some embodiments, at least one of the storage arrays 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage arrays 105 in other embodiments.

The term "storage system" as used herein is therefore intended to be broadly construed, and should not be viewed as being limited to content addressable storage systems or flash-based storage systems. A given storage system as the term is broadly used herein can comprise, for example, the above-noted SANs, network-attached storage (NAS), direct-attached storage (DAS) or distributed DAS, as well as combinations of these and other storage types, including software-defined storage.

Other particular types of storage products that can be used in implementing storage arrays 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage arrays 105-1 and 105-2 are assumed to be arranged in an active-active configuration. In such an arrangement, data stored in one of the storage arrays is replicated to the other one of the storage arrays utilizing a replication process. Such data replication across the multiple storage arrays 105 can be used to facilitate failure recovery in the system 100. One of the storage arrays may therefore operate as a production storage array relative to the other storage array which operates as a backup or recovery storage array.

In the present embodiment, it is assumed that the storage arrays 105-1 and 105-2 participate in a replication process that more particularly comprises a synchronous replication process. In accordance with the synchronous replication process, a given one of the host devices 102 writes data to one of the storage arrays 105, and that host device receives an acknowledgement of success only after the data has been successfully written to both of the storage arrays 105. For example, the given host device in such an embodiment can clone a given host write such that the host write is delivered to both the first and second storage arrays 105. Such cloning arrangements in the present embodiment are also referred to herein as involving mirroring of host writes from the given host device to the storage systems 105. Other types of cloning arrangements can be used in other embodiments. Terms such as "clone" and "cloning" as used herein are intended to be broadly construed, so as to encompass, for example, arrangements in which a host device generates a copy of a host write or other IO operation, such that the original IO operation can be delivered to the first storage array 105-1 and the copy can be delivered to the second storage array 102-2, or vice versa.

Such copying of IO operations or other types of cloning arrangements is assumed to be performed by the host device in some embodiments, but in other embodiments, one or both of the storage arrays 105 can participate with the host device in controlling one or more aspects of a cloning operation as disclosed herein. Thus, in some embodiments, one or more of the host devices 102 and the storage arrays 105 cooperate with one another in controlling cloning of IO operations. For example, a replication engine of a storage array can provide "hints" or other types of information regarding an ongoing replication process available to the host devices 102. This information is utilized by the host devices 102 to avoid unnecessary cloning of IO operations in order to conserve network bandwidth and host device processing resources, as will be described in more detail elsewhere herein.

A synchronous replication process of the type described above is therefore configured to mirror data writes from one or more of the host devices 102 to both of the storage arrays 105. Other types of replication processes may be used in other embodiments.

Accordingly, a "replication process" as that term is broadly used herein may include both asynchronous and synchronous replication modes as well as support for concurrent operation of such modes and separate operation of the individual modes. Thus, the storage arrays 105 in illustrative embodiments are configured to transition from an asynchronous replication mode to a synchronous replication mode, and vice versa. It is also possible in some embodiments that a given replication process implemented using storage arrays 105 may comprise only synchronous replication or only asynchronous replication, instead of multiple distinct replication modes. Numerous other replication arrangements are possible. For example, as indicated previously, the term "replication" as broadly used herein is intended to encompass migration, copying or other similar operations involving logical storage volumes. A given replication process can therefore involve migrating a logical storage volume from the first storage array 105-1 to the second storage array 105-2.

It is assumed that the storage controllers 108 of the respective storage arrays 105 each comprise replication control logic and a snapshot generator. The replication control logic controls performance of the above-noted synchronous replication process. The snapshot generator is used to generate snapshots of one or more storage volumes that are subject to synchronous replication in conjunction with active-active storage clustering.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for synchronous replication between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, respective instances of IO cloning control logic 111-1 and 111-2, and respective multi-path input-output (MPIO) drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

The instances of IO cloning control logic 111-1 and 111-2 in this embodiment are shown in dashed outline within their respective host devices 102-1 and 102-2, as the particular placement of these components can be varied. For example, it is possible for the instances of IO cloning control logic 111-1 and 111-2 to be implemented in whole or in part within respective ones of the MPIO drivers 112-1 and 112-2.

The MPIO drivers 112 may comprise, for example, otherwise conventional MPIO drivers, such as PowerPath® drivers from Dell EMC, suitably modified in the manner disclosed herein to control cloning of IO operations. Other types of MPIO drivers from other driver vendors may be suitably modified to incorporate functionality for IO cloning control as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100. Determinations regarding whether or not particular IO operations of the first host device 102-1 will be cloned for delivery to both the first and second storage arrays 105 are made by the corresponding instance of IO cloning control logic 111-1.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for a migration operation or another type of replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

Various scheduling algorithms, load balancing algorithms and/or other types of algorithms can be utilized by the MPIO driver 112-1 in delivering IO operations from the IO queues 110-1 to the storage arrays 105 over particular paths via the network 104. Each such IO operation is assumed to comprise one or more commands for instructing at least one of the storage arrays 105 to perform particular types of storage-related functions such as reading data from or writing data to particular logical volumes of the storage arrays. Such commands are assumed to have various payload sizes associated therewith, and the payload associated with a given command is referred to herein as its "command payload."

A command directed by the host device 102-1 to at least one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage arrays 105. Examples of such HBAs and storage array ports are illustrated in conjunction with the embodiment of FIG. 3.

The above-described functions associated with automated path selection functionality of the MPIO driver 112-1 are illustratively carried out at least in part under the control of its path selection logic 114-1.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform the disclosed automated path selection functionality. Accordingly, automated path selection functionality described above in the context of the first MPIO driver 112-1 is assumed to be similarly performed by the other MPIO driver 112-2. The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein.

As will be described in more detail below, the host devices 102 perform IO cloning control operations utilizing IO cloning control logic instances 111 in order to substantially reduce the number of IO operations that are cloned in system 100 for delivery to both the first and second storage arrays 105 over the network 104, thereby conserving network bandwidth and host device processing resources.

For example, the host device 102-1 in the present embodiment is configured to execute at least one application. Each such application comprises one or more processes that generate IO operations, such as write requests or other types of IO operations, directed to particular logical addresses in logical storage volumes of one or more of the storage arrays 105. It is assumed in this embodiment that the first and second storage arrays 105 are configured to participate in a replication process in which one or more logical storage volumes are replicated from the first storage array 105-1 to the second storage array 105-2, illustratively using synchronous replication in an active-active configuration. These and other replication operations are in some embodiments performed by what is referred to herein as "native replication software" of respective ones of the first and second storage arrays 105. For each of a plurality of IO operations generated by the application, the host device 102-1 determines a replication status of a particular portion of a given one of the logical storage volumes to which the IO operation is directed, and controls cloning of the IO operation based at least in part on the replication status of the particular portion of the given logical storage volume.

More particularly, responsive to the IO operation being cloned, the host device 102-1 delivers resulting first and second instances of the IO operation to the respective first and second storage arrays 105-1 and 105-2, and responsive to the IO operation not being cloned, the host device 102-1 delivers the IO operation to only the first storage array 105-1. As mentioned previously, "cloning" an IO operation as that term is broadly used herein illustratively comprises generating a copy of the IO operation, although other types of cloning arrangements are possible in other embodiments.

The above-noted operations of the host device 102-1 are performed at least in part by its corresponding instance of IO cloning control logic 111-1. As mentioned previously, that instance of IO cloning control logic 111-1 may be implemented in some embodiments in whole or in part within the MPIO driver 112-1.

By way of example, the particular portion of the given logical storage volume illustratively comprises a logical address range of the given logical storage volume, such as a range of logical block addresses (LBAs) of the given logical storage volume. It is assumed in this case that the replication process is carried out using multiple distinct ranges of logical addresses of the given logical storage volume. Accordingly, near the beginning of the replication process, relatively few of the distinct ranges of logical addresses have been replicated or are in the process of being replicated from the first storage array 105-1 to the second storage array 105-2, while near the end of the replication process, most or all of the distinct ranges of logical addresses have been replicated or are in the process of being replicated from the first storage array 105-1 to the second storage array 105-2.

In such an arrangement, the host device 102-1, for each of a plurality of IO operations generated by the application, determines a replication status of the logical address range to which the IO operation is directed, and controls cloning of the IO operation based at least in part on the replication status of the logical address range to which the IO operation is directed. A more detailed example of an arrangement of this type is described below in conjunction with the embodiment of FIG. 2.

In some embodiments, determining the replication status of the particular portion of the given logical storage volume illustratively comprises determining the replication status based at least in part on information obtained by the host device 102-1 from the first storage array 105-1. For example, the information can be obtained by the host device 102-1 from the first storage array 105-1 utilizing an in-band communication mechanism in which one or more commands in a designated storage protocol, such as a SCSI protocol, are sent from the host device 102-1 to the first storage array 105-1.

Additionally or alternatively, the information can be obtained by the host device 102-1 from the first storage array 105-1 utilizing an out-of-band communication mechanism in which, for example, host management software of the host device 102-1 communicates with storage array management software of the first storage array 105-1 over an IP network connection, although other types of communication and networking protocols can be used.

Additional details regarding such in-band and out-of-band communication mechanisms are provided elsewhere herein.

The replication status of the particular portion of the given logical storage volume is illustratively identified as one of the following: (i) already replicated; (ii) in the process of being replicated; and (iii) not yet replicated. These particular states are assumed to be mutually exclusive. In other words, the particular portion of the given logical storage volume can only be in one of these states at a time, such that, for example, the "not yet replicated" state is interpreted as "not yet replicated and not yet in the process of being replicated." Other types and arrangements of replication status states can be used in other embodiments.

In embodiments utilizing the states (i), (ii) and (iii) above for indicating replication status of the particular portion of the given logic storage volume, controlling cloning of the IO operation based at least in part on the replication status of the portion of the logical storage volume illustratively proceeds as follows. Responsive to the replication status being one of (i) already replicated or (ii) in the process of being replicated, the host device 102-1 clones the IO operation so as to provide first and second instances of the IO operation for delivery by the MPIO driver 112-1 to the respective first and second storage arrays 105-1 and 105-2. Responsive to the replication status being (iii) not yet replicated, the host device 102-1 refrains from cloning the IO operation so as to provide only a single instance of the IO operation for delivery by the MPIO driver 112-1 to the first storage array 105-1.

The host device 102-1 in determining the replication status of the particular portion of the given logical storage volume illustratively polls the first storage array 105-1 to obtain information identifying one or more LBA ranges that have either already been replicated from the first storage array 105-1 to the second storage array 105-2 or are in the process of being replicated from the first storage array 105-1 to the second storage array 105-2, and compares one or more LBAs of the IO operation to the information obtained via the polling of the first storage array 105-1.

The host device 102-1 implements polling of the first storage array 105-1 by, for example, sending one or more predetermined commands to the first storage array 105-1. This is an example of an in-band communication mechanism of the type described previously. A given one of the one or more predetermined commands illustratively comprises at least one of a log sense command, a mode sense command and a vendor unique command of a SCSI protocol, although other commands of other storage protocols can be used. The polling can be periodic, such that the predetermined commands are issued at regular intervals, and/or can be triggered by other conditions, such as arrival of a threshold number of IO operations to be processed for IO cloning control purposes.

As mentioned previously, embodiments are not limited to polling using in-band communication mechanisms, and out-of-band communication mechanisms, illustratively involving management software of the host device 102-1 and storage array 105-1 communicating over IP connections, can additionally or alternatively be used.

The host device 102-1 in some embodiments is further configured to provide an acknowledgement back to the first storage array 105-1 that the host device 102-1 has successfully obtained the replication status information for the particular portion of the given logical storage volume, via the above-described polling or otherwise. The first storage array 105-1 in arrangements of this type is configured to condition its replication of another portion of the given logical storage volume to the second storage array 105-2 based at least in part on receipt of the acknowledgement from the host device 102-1. Such an arrangement provides a type of "handshake" between the host device 102-1 and the first storage array 105-1 that ensures that the host device 102-1 always has the most current replication status information from the first storage array 105-1. Other types of handshake mechanisms can be used to ensure that the host device 102-1 and the first storage array 105-1 are consistent in their respective views of the status of the replication process.

As indicated previously, absent use of the IO cloning control techniques as disclosed herein, excessive amounts of network bandwidth and host device processing resources are consumed.

Such drawbacks are advantageously overcome in illustrative embodiments herein by utilization of IO cloning control logic instances 111 of respective host devices 102 to determine whether or not a given IO operation should be cloned, based on the current replication status of the particular logical address range or other portion of a logical storage volume to which the given IO operation is directed.

It is to be appreciated that these and other features of illustrative embodiments are presented by way of example only, and should not be construed as limiting in any way. Accordingly, different numbers, types and arrangements of system components such as host devices 102, network 104, storage arrays 105, storage devices 106, storage controllers 108, sets of IO queues 110, instances of IO cloning control logic 111, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of information processing systems comprising at least one host device and at least first and second storage systems. The first and second storage systems in this embodiment are more particularly assumed to comprise respective first and second storage arrays, each having a plurality of storage devices. The storage devices can include logical storage devices such as LUNs or other logical storage volumes.

Figure 2:
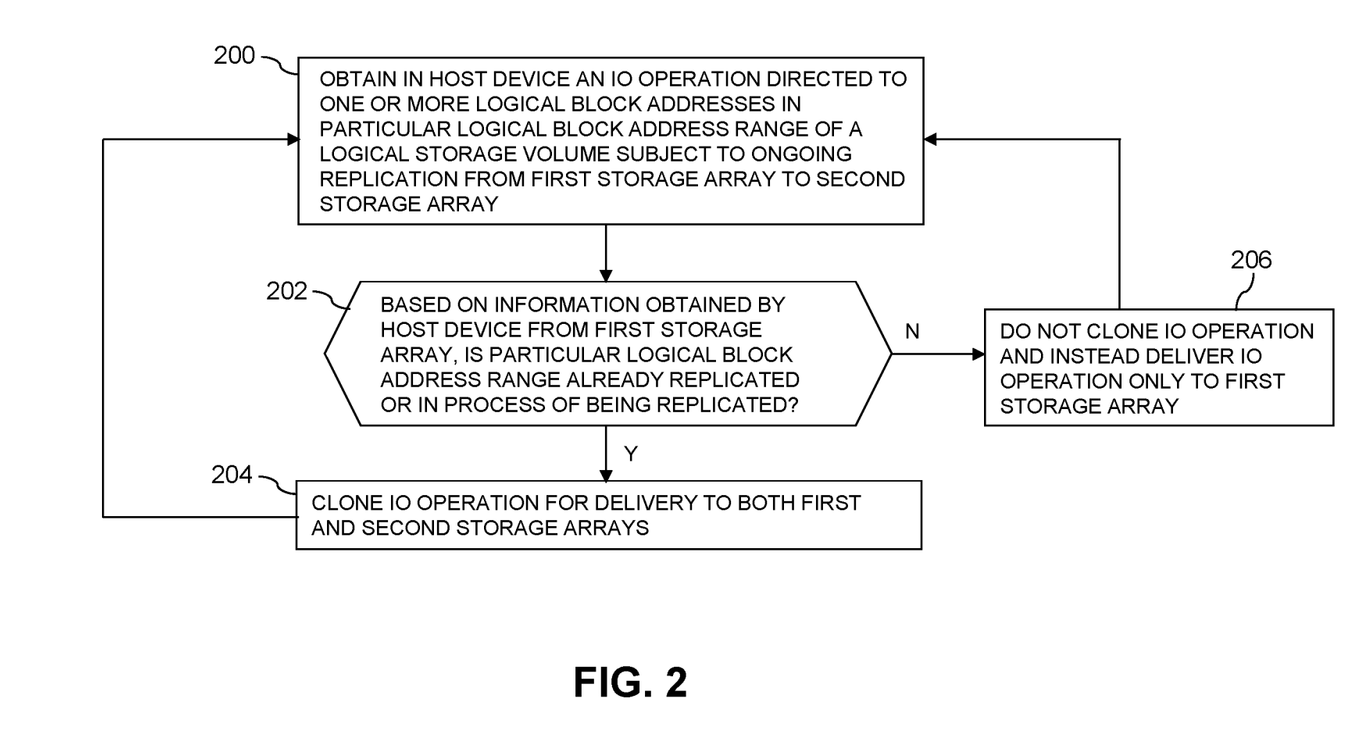
FIG. 2 is a flow diagram of a process for controlled cloning of IO operations of a host device in an illustrative embodiment.

The steps of the FIG. 2 process are illustratively performed at least in part by or under the control of an instance of IO cloning control logic of the host device. Accordingly, the FIG. 2 process may be viewed as an example of an algorithm performed by the IO cloning control logic 111-1 of host device 102-1. As indicated previously, such IO cloning control logic can be implemented wholly or partially within a corresponding MPIO driver of the host device. For example, portions of the FIG. 2 process may be carried out under the control of software, firmware and/or hardware comprising an instance of IO cloning control logic deployed within the MPIO driver. Other arrangements of host device components and/or other system components can be configured to perform at least portions of one or more of the steps of the FIG. 2 process in other embodiments.

In step 200, an IO operation is obtained in the host device. For example, the IO operation may be obtained by retrieving it from one of a plurality of IO queues of the host device. It is assumed that the IO operation is generated by an application running on the host device, and is queued with other operations generated by that application and possibly other applications for further processing that includes IO cloning control. The IO operation in this embodiment is directed to one or more logical block addresses in a particular logical block address range of a logical storage volume subject to ongoing replication from the first storage array to the second storage array. Logical block addresses, also referred to herein as LBAs, are examples of what are more generally referred to herein as "logical addresses" of a LUN or other type of logical storage volume.

In step 202, a determination is made, based on information obtained by the host device from the first storage array, as to whether or not the particular logical block address range has already been replicated or is in the process of being replicated. If the particular logical block address range has already been replicated or is in the process of being replicated, the FIG. 2 process moves to step 204, and otherwise moves to step 206.

In step 204, the IO operation is cloned for delivery to both the first and second storage arrays. The cloned IO operation is assumed to be delivered to the first and second storage arrays over selected paths under the control of an MPIO driver of the host device. The FIG. 2 process then returns to step 200 as indicated to obtain another IO operation to determine whether or not it should be cloned.

In step 206, the IO operation is not cloned for delivery to both the first and second storage arrays, but is instead delivered to only the first storage array. The non-cloned IO operation is assumed to be delivered to the first storage array over a selected path under the control of an MPIO driver of the host device. The FIG. 2 process then returns to step 200 as indicated to obtain another IO operation to determine whether or not it should be cloned.

Multiple additional instances of the FIG. 2 process may be performed in respective additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and IO cloning control functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different IO cloning control arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
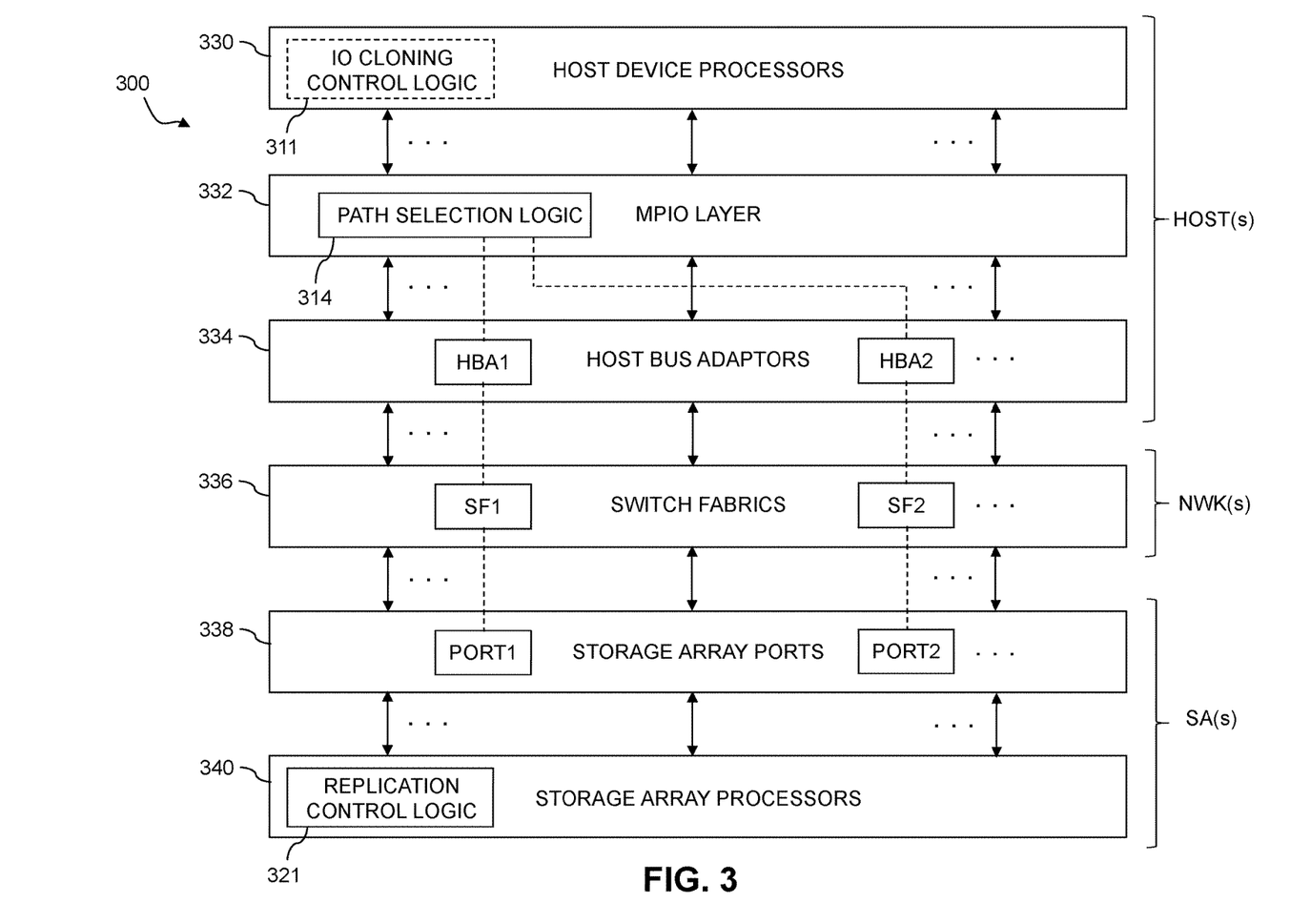
FIG. 3 is a block diagram showing multiple layers of a layered system architecture that includes a host device with functionality for controlled cloning of IO operations in an illustrative embodiment.

Referring now to FIG. 3, another illustrative embodiment is shown. In this embodiment, an information processing system 300 comprising one or more instances of each of IO cloning control logic 311, path selection logic 314 and replication control logic 321 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements 10 cloning control logic 311 as part of one or more host device processors of the host device processor layer 330. Again, other implementations are possible, and the IO cloning control logic 311 is therefore shown in dashed outline. For example, the IO cloning control logic 311 in other embodiments is illustratively implemented in the MPIO layer 332. As another example, different portions of the IO cloning control logic 311 can be implemented in the host device processor layer 330 and the MPIO layer 332, respectively. It is therefore possible in some embodiments that the IO cloning control logic 311 can be implemented within a component of the MPIO layer 332, such as within the path selection logic 314.

The MPIO layer 332 is an example of what is also referred to herein as a multi-path layer, and comprises one or more MPIO drivers implemented in respective host devices. Each such MPIO driver illustratively comprises an instance of path selection logic 314 configured substantially as previously described. Additional or alternative layers and path selection logic arrangements can be used in other embodiments.

The replication control logic 321 implemented in the storage array processors layer 340 illustratively includes multiple replication control logic instances on respective ones of a plurality of storage arrays. These multiple replication control logic instances collectively form a replication engine that controls replication of storage volumes between at least first and second ones of the storage arrays using an active-active synchronous replication process or other type of replication process as described elsewhere herein. In some embodiments, the replication control logic 321 comprises what is referred to herein as "native replication software" of respective ones of multiple storage arrays.

In the system 300, path selection logic 314 is configured to select different paths for sending 10 operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

It is assumed in this embodiment that the host devices through respective instances of IO cloning control logic 311 provide functionality associated with IO cloning control, possibly with involvement of other host device components.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional examples of illustrative embodiments implemented using the FIG. 2 process for IO cloning control will now be described. It is assumed in these embodiments that the MPIO driver of a given host device provides IO cloning control functionality, under the control of a corresponding instance of path selection logic implemented in the MPIO driver, possibly with involvement of other host device components.

The MPIO driver is illustratively implemented using the above-described PowerPath® software from Dell EMC, but modified to incorporate IO cloning control functionality. More particularly, these embodiments illustratively implement the IO cloning control functionality as part of the PowerPath® Migration Enabler feature of the PowerPath® MPIO driver. Other types of host device software utilized to handle migration can be similarly modified to include IO cloning control functionality as disclosed herein. The PowerPath® Migration Enabler feature generally orchestrates migration of logical storage volumes by setting up and managing individual migration sessions and handling application IO operations during migration, including cloning of write requests to ensure that the first and second storage arrays remain in synchronization during such migration. Using the IO cloning control techniques disclosed herein, the PowerPath® Migration Enabler feature is modified to ensure that IO operations are not cloned if those IO operations are directed to portions of a logical storage volume that has not yet been migrated from the first storage array to the second storage array.

The embodiments are not limited for use with the PowerPath® Migration Enabler feature or any other particular type of migration software of a host device. Accordingly, other types of migration software can be used to implement migration operations in illustrative embodiments disclosed herein.

Such migration is assumed to be a type of "replication" as that term is broadly used herein, as indicated previously. As the native replication functionality of the storage arrays generally replicates the logical storage volume in multiple stages using respective distinct ranges of logical addresses as previously described, and will eventually replicate the entire logical storage volume, it is not necessary for the host device to clone write requests that are directed to a logical address range that has not yet been replicated. Instead, it is sufficient for those write requests to be directed to the first storage array. By modifying the PowerPath® Migration Enabler feature to include IO cloning control functionality as disclosed herein, the number of write requests that need to be cloned is significantly reduced, particularly in cases in which write-intensive applications are executing on the host device.

In this embodiment, a replication engine implemented using native replication software of the first storage array "publishes" or otherwise makes available to the host device migration records or other types of replication status information that indicates the logical storage volume portions that have already been replicated from the first storage array to the second storage array, or are in the process of being replicated from the first storage array to the second storage array. The host device periodically reads such information from the first storage array, and uses that information to control cloning of IO operations.

For example, this embodiment is illustratively configured to determine whether or not to clone a given write request based on its designated LBA, with the native replication software of the first storage array publishing migration records or other types of replication status information that indicate the particular LBA ranges of the logical storage volume that are already replicated or currently under replication, with such information being read periodically by the multi-path layer of the host device. With the availability of this information, the multi-path layer of the host device can determine whether or not cloning is needed by checking the range of LBAs involved in application write requests. If the portions of the logical storage volume corresponding to the current write LBAs are not already replicated or not in the process of being replicated by the native replication software of the first storage array, then the host device need not clone those write requests, as the native replication software will eventually copy the corresponding portions of the logical storage volume to the second storage array at some later point during the replication process. However, if the portions of the logical storage volume corresponding to the current write LBAs are already replicated or in the process of being replicated by the native replication software, then the host device will need to clone those write requests, in order to ensure that the first and second storage arrays maintain consistent views of the logical storage volume. Nonetheless, substantial reductions in IO cloning are achieved in illustrative embodiments, particularly in the early stages of the replication process when most LBA ranges have not yet been replicated. The reductions diminish as the replication process reaches the later stages when most LBA ranges have already been replicated.

In order to ensure that the host device and the first storage array are in synchronization with regard to the current replication status, a handshake mechanism of the type described elsewhere herein is used. This handshake mechanism allows the host device and the first storage array to coordinate replication of additional LBA ranges of the logical storage volume. For example, the native replication software of the first storage array is illustratively configured to begin the replication of a particular LBA range of the logical storage volume only after the host device has obtained the current replication status information and provided an appropriate acknowledgement back to the first storage array.

In some embodiments, in-band mechanisms are used by the host device to read the current replication status information from the first storage array. For example, the host device can issue a read command to read the replication status information, and after the read is successfully completed, can use a mode select command or other type of command to acknowledge the successful read to the first storage array. For example, a vendor unique implementation of the mode select command can be configured to update a particular generation number associated with the replication process in the first storage array. The native replication software of the first storage array checks the updated generation number to confirm that the host device has read the current replication status information, and then proceeds to initiate replication of the next LBA range, after which it updates the replication status information accordingly. This type of handshake mechanism ensures that the host device and the first storage array both have the latest replication status information, and avoids any inconsistencies in their respective views of the ongoing replication process.

Other types of in-band and out-of-band mechanisms can be used in other embodiments to provide migration records or other types of replication status information to the host device for use in IO cloning control. As mentioned previously, communication between host device software and storage array software over IP connections can be used to provide a suitable out-of-band mechanism.

In embodiments in which the host device periodically polls the first storage array for replication status information, the interval of the periodic polling can be a user-configurable parameter. Other factors such as the data throughput rate of the native replication software of the storage arrays can be taken into account in determining an appropriate polling interval for obtaining replication status information.

The particular IO cloning control arrangements described above are presented by way of illustrative example only. Numerous alternative arrangements of these and other features can be used in implementing the FIG. 2 process and other illustrative embodiments.

The illustrative embodiments disclosed herein can provide a number of significant advantages relative to conventional arrangements.

For example, some embodiments can substantially reduce the amounts of network bandwidth and host device processing resources that would otherwise be consumed when one or more host devices are communicating with multiple storage arrays participating in replication processes, such as synchronous replication processes using an active-active configuration. This leads to improved overall performance of the information processing system that includes the host device(s) and storage arrays.

As another example, some embodiments configure a multi-path layer or other portions of one or more host devices to include functionality for IO cloning control. Leveraging the existing path selection functionality of the multi-path layer to facilitate IO cloning control provides significant additional advantages in such embodiments.

These and other embodiments can significantly reduce SAN traffic caused by unnecessary write cloning overhead, thereby increasing the amount of SAN bandwidth available for applications.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of IO cloning control logic 111 and/or path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, IO cloning control logic, MPIO drivers, path selection logic and additional or alternative components. Also, the particular configurations of system and device elements and associated processing operations illustratively shown in the drawings can be varied in other embodiments. For example, a wide variety of different host device configurations and associated IO cloning control arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with at least first and second storage systems each comprising a plurality of storage devices;
the first and second storage systems being configured to participate in a replication process in which one or more logical storage volumes are replicated from the first storage system to the second storage system;
wherein the host device is further configured:
to execute at least one application; and
for each of a plurality of input-output operations generated by the application:
to determine a replication status of a particular portion of a given one of the logical storage volumes to which the input-output operation is directed; and
to control cloning of the input-output operation in the host device based at least in part on the replication status of the particular portion of the given logical storage volume;
wherein determining the replication status of the particular portion of the given logical storage volume and controlling cloning of the input-output operation based at least in part on the replication status are performed at least in part by a multi-path input-output driver of the host device.

2. The apparatus of claim 1 wherein the input-output operations comprise respective write requests.

3. The apparatus of claim 1 wherein the replication process comprises a synchronous replication process in which the first and second storage systems are arranged in an active-active configuration relative to one another.

4. The apparatus of claim 1 wherein the particular portion of the given logical storage volume comprises a logical address range of the given logical storage volume.

5. The apparatus of claim 1 wherein the host device is further configured:
responsive to the input-output operation being cloned, to deliver resulting first and second instances of the input-output operation to the respective first and second storage systems; and
responsive to the input-output operation not being cloned, to deliver the input-output operation to only the first storage system.

6. The apparatus of claim 1 wherein determining the replication status of the particular portion of the given logical storage volume comprises determining the replication status based at least in part on information obtained by the host device from the first storage system, wherein the information is obtained by the host device from the first storage system utilizing at least one of:
an in-band communication mechanism in which one or more commands in a designated storage protocol are sent from the host device to the first storage system; and
an out-of-band communication mechanism in which host management software of the host device communicates with storage system management software of the first storage system over an Internet Protocol (IP) network connection.

7. The apparatus of claim 1 wherein determining the replication status of the particular portion of the given logical storage volume comprises identifying the replication status as one of the following:
(i) already replicated;
(ii) in process of being replicated; and
(iii) not yet replicated.

8. The apparatus of claim 7 wherein controlling cloning of the input-output operation based at least in part on the replication status of the portion of the logical storage volume comprises:
responsive to the replication status being one of (i) already replicated or (ii) in process of being replicated, cloning the input-output operation so as to provide first and second instances of the input-output operation for delivery to the respective first and second storage systems.

9. The apparatus of claim 7 wherein controlling cloning of the input-output operation based at least in part on the replication status of the portion of the logical storage volume comprises:
responsive to the replication status being (iii) not yet replicated, refraining from cloning the input-output operation so as to provide only a single instance of the input-output operation for delivery to the first storage system.

10. The apparatus of claim 1 wherein the host device further comprises:
a plurality of host bus adaptors;
the multi-path input-output driver being configured to control delivery of input-output operations from the host device to the first and second storage systems over selected ones of a plurality of paths through the network; and
the paths being associated with respective initiator-target pairs wherein each of the initiators comprises a corresponding one of the host bus adaptors of the host device and each of the targets comprises a corresponding one of a plurality of ports of the first and second storage systems.

11. An apparatus comprising:
a host device configured to communicate over a network with at least first and second storage systems each comprising a plurality of storage devices;
the first and second storage systems being configured to participate in a replication process in which one or more logical storage volumes are replicated from the first storage system to the second storage system;
wherein the host device is further configured:
to execute at least one application; and
for each of a plurality of input-output operations generated by the application:
to determine a replication status of a particular portion of a given one of the logical storage volumes to which the input-output operation is directed; and
to control cloning of the input-output operation in the host device based at least in part on the replication status of the particular portion of the given logical storage volume;
wherein determining the replication status of the particular portion of the given logical storage volume comprises:
polling the first storage system to obtain information identifying one or more logical block address ranges that have either already been replicated from the first storage system to the second storage system or are in the process of being replicated from the first storage system to the second storage system; and
comparing one or more logical block addresses of the input-output operation to the information obtained via the polling of the first storage system.

12. The apparatus of claim 11 wherein polling the first storage system to obtain information identifying one or more logical block address ranges comprises sending one or more predetermined commands to the first storage system, a given one of the one or more predetermined commands comprising at least one of a log sense command, a mode sense command and a vendor unique command.

13. The apparatus of claim 11 wherein polling the first storage system to obtain information identifying one or more logical block address ranges comprises providing an acknowledgement to the first storage system that the host device has successfully obtained the information and wherein the first storage system conditions its replication of another portion of the given logical storage volume to the second storage system based at least in part on receipt of the acknowledgement from the host device.

14. A method comprising:
executing an application on a host device, the host device being configured to communicate over a network with at least first and second storage systems each comprising a plurality of storage devices;
the first and second storage systems being configured to participate in a replication process in which one or more logical storage volumes are replicated from the first storage system to the second storage system;
for each of a plurality of input-output operations generated by the application:
determining a replication status of a particular portion of a given one of the logical storage volumes to which the input-output operation is directed; and
controlling cloning of the input-output operation in the host device based at least in part on the replication status of the particular portion of the given logical storage volume;
wherein determining the replication status of the particular portion of the given logical storage volume and controlling cloning of the input-output operation based at least in part on the replication status are performed at least in part by a multi-path input-output driver of the host device.

15. The method of claim 14 further comprising:
responsive to the input-output operation being cloned, delivering resulting first and second instances of the input-output operation to the respective first and second storage systems; and
responsive to the input-output operation not being cloned, delivering the input-output operation to only the first storage system.

16. The method of claim 14 wherein determining the replication status of the particular portion of the given logical storage volume comprises determining the replication status based at least in part on information obtained by the host device from the first storage system.

17. A computer program product comprising a non-transitory processor-readable storage medium having stored therein program code of one or more software programs, wherein the program code, when executed by a host device, the host device being configured to communicate over a network with at least first and second storage systems each comprising a plurality of storage devices, the first and second storage systems being configured to participate in a replication process in which one or more logical storage volumes are replicated from the first storage system to the second storage system, causes the host device:

to execute at least one application; and for each of a plurality of input-output operations generated by the application:

to determine a replication status of a particular portion of a given one of the logical storage volumes to which the input-output operation is directed; and to control cloning of the input-output operation in the host device based at least in part on the replication status of the particular portion of the given logical storage volume;

wherein determining the replication status of the particular portion of the given logical storage volume and controlling cloning of the input-output operation based at least in part on the replication status are performed at least in part by a multi-path input-output driver of the host device.

18. The computer program product of claim 17 wherein the program code when executed by the host device further causes the host device:

responsive to the input-output operation being cloned, to deliver resulting first and second instances of the input-output operation to the respective first and second storage systems; and responsive to the input-output operation not being cloned, to deliver the input-output operation to only the first storage system.

19. The computer program product of claim 17 wherein determining the replication status of the particular portion of the given logical storage volume comprises determining the replication status based at least in part on information obtained by the host device from the first storage system.

20. The computer program product of claim 17 wherein determining the replication status of the particular portion of the given logical storage volume comprises:

polling the first storage system to obtain information identifying one or more logical block address ranges that have either already been replicated from the first storage system to the second storage system or are in the process of being replicated from the first storage system to the second storage system; and comparing one or more logical block addresses of the input-output operation to the information obtained via the polling of the first storage system.

* * * * *